United States Patent
Jain et al.

(10) Patent No.: US 11,544,262 B2
(45) Date of Patent: *Jan. 3, 2023

(54) TRANSIENT MATERIALIZED VIEW REWRITE

(71) Applicant: Snowflake Inc., Bozeman, MT (US)

(72) Inventors: Shrainik Jain, Seattle, WA (US); Allison Waingold Lee, San Mateo, CA (US); Boyung Lee, Kirkland, WA (US); Prasanna Rajaperumal, San Mateo, CA (US); Jiaqi Yan, San Mateo, CA (US); Yongsik Yoon, Sammamish, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/538,219

(22) Filed: Nov. 30, 2021

(65) Prior Publication Data

US 2022/0092068 A1    Mar. 24, 2022

Related U.S. Application Data

(63) Continuation of application No. 16/994,024, filed on Aug. 14, 2020, now Pat. No. 11,216,462.

(51) Int. Cl.
*G06F 16/2453*    (2019.01)
(52) U.S. Cl.
CPC ............................. *G06F 16/24542* (2019.01)
(58) Field of Classification Search
None
See application file for complete search history.

(56) References Cited

U.S. PATENT DOCUMENTS

| | | | |
|---|---|---|---|
| 6,510,422 B1* | 1/2003 | Galindo-Legaria | .........................  G06F 16/24539 707/999.102 |
| 2004/0122814 A1* | 6/2004 | Zhang | ............... G06F 16/24539 |
| 2005/0234971 A1* | 10/2005 | Folkert | ............. G06F 16/24539 707/999.102 |
| 2010/0201860 A1* | 8/2010 | Rhodes | ............. H01L 27/14643 348/308 |
| 2010/0281017 A1* | 11/2010 | Hu | ...................... G06F 16/2453 707/718 |
| 2019/0220464 A1* | 7/2019 | Butani | ............... G06F 16/24542 |
| 2019/0236189 A1* | 8/2019 | Jindal | ................. G06F 16/2454 |

(Continued)

OTHER PUBLICATIONS

"U.S. Appl. No. 16/994,024, Examiner Interview Summary dated Feb. 19, 2021", 2 pgs.

(Continued)

*Primary Examiner* — Christopher J Raab
(74) *Attorney, Agent, or Firm* — Schwegman Lundberg & Woessner, P.A.

(57) ABSTRACT

Queries executed against a materialized view can execute up to orders of magnitude faster than equivalent queries on a source (or base) table. However, although a query can reference a materialized view directly, a user (e.g., query author) may not know about a relevant materialized view. Moreover, if a source table has multiple materialized views generated, the user may not know which materialized view to reference in the query. Thus, embodiments of the present disclosure provide techniques for automatically rewriting queries directed to a source table to utilize existing materialized views.

24 Claims, 13 Drawing Sheets

(56) References Cited

U.S. PATENT DOCUMENTS

2019/0384844 A1 12/2019 Ding et al.
2020/0201860 A1 6/2020 Vogelsgesang et al.

OTHER PUBLICATIONS

"U.S. Appl. No. 16/994,024, Final Office Action dated Mar. 19, 2021", 20 pgs.
"U.S. Appl. No. 16/994,024, Non-Final Office Action dated Jun. 24, 2021", 20 pgs.
"U.S. Appl. No. 16/994,024, Non-Final Office Action dated Nov. 18, 2020", 17 pgs.
"U.S. Appl. No. 16/994,024, Notice of Allowance dated Nov. 4, 2021", 5 pgs.
"U.S. Appl. No. 16/994,024, Response filed Feb. 18, 2021 to Non-Final Office Action dated Nov. 18, 2020", 12 pgs.
"U.S. Appl. No. 16/994,024, Response filed Apr. 23, 2021 to Final Office Action dated Mar. 19, 2021", 12 pgs.
"U.S. Appl. No. 16/994,024, Response filed Sep. 24, 2021 to Non-Final Office Action dated Jun. 24, 2021", 11 pgs.
"International Application Serial No. PCT/US2021/039644, International Search Report dated Jul. 30, 2021", 2 pgs.
"International Application Serial No. PCT/US2021/039644, Written Opinion dated Jul. 30, 2021", 6 pgs.
U.S. Appl. No. 16/994,024, filed Aug. 14, 2020, Transient Materialized View Rewrite.

* cited by examiner

TRANSIENT MATERIALIZED VIEW REWRITE

CROSS-REFERENCE TO RELATED APPLICATION

This application is a Continuation of U.S. patent application Ser. No. 16/994,024, filed Aug. 14, 2020, the contents of which are incorporated herein by reference in their entirety.

TECHNICAL FIELD

The present disclosure generally relates to using materialized views in data storage systems.

BACKGROUND

Databases are widely used for data storage and access in computing applications. A goal of database storage is to provide enormous sums of information in an organized manner so that it can be accessed, managed, and updated. In a database, data may be organized into rows, columns, and tables. Different database storage systems may be used for storing different types of content, such as bibliographic, full text, numeric, and/or image content. Further, in computing, different database systems may be classified according to the organization approach of the database. There are many different types of databases, including relational databases, distributed databases, cloud databases, object-oriented and others.

When a user wants to query a database to extract certain information from the database, a query statement is executed against the database data. The query returns certain data according to one or more query predicates that indicate what information should be returned by the query. The query extracts specific data from the database and formats that data into a readable form. The query may be written in a language that is understood by the database, such as Structured Query Language ("SQL"), so the database systems can determine what data should be located and how it should be returned. The query may request any pertinent information that is stored within the database. If the appropriate data can be found to respond to the query, the database has the potential to reveal complex trends and activities.

However, the database may store an enormous amount of information. It can be challenging to execute queries on such an enormous amount of data because a significant amount of time and computing resources is required to scan the entire table.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Materialized views can speed up expensive aggregation, projection, selection, and other operations, especially those that are run frequently on large data sets. Queries executed against a materialized view can execute up to orders of magnitude faster than equivalent queries on a source (or base) table. However, although a query can reference a materialized view directly, a user (e.g., query author) may not know about a relevant materialized view. Moreover, if a source table has multiple materialized views generated, the user may not know which materialized view to reference in the query. Thus, embodiments of the present disclosure provide techniques for automatically rewriting queries directed to a source table to utilize existing materialized views. The rewritten queries implement predicate, filter, and/or aggregation subsumption checks to replace fragments of a query with logically equivalent plans utilizing one or more materialized views.

Figure 1:
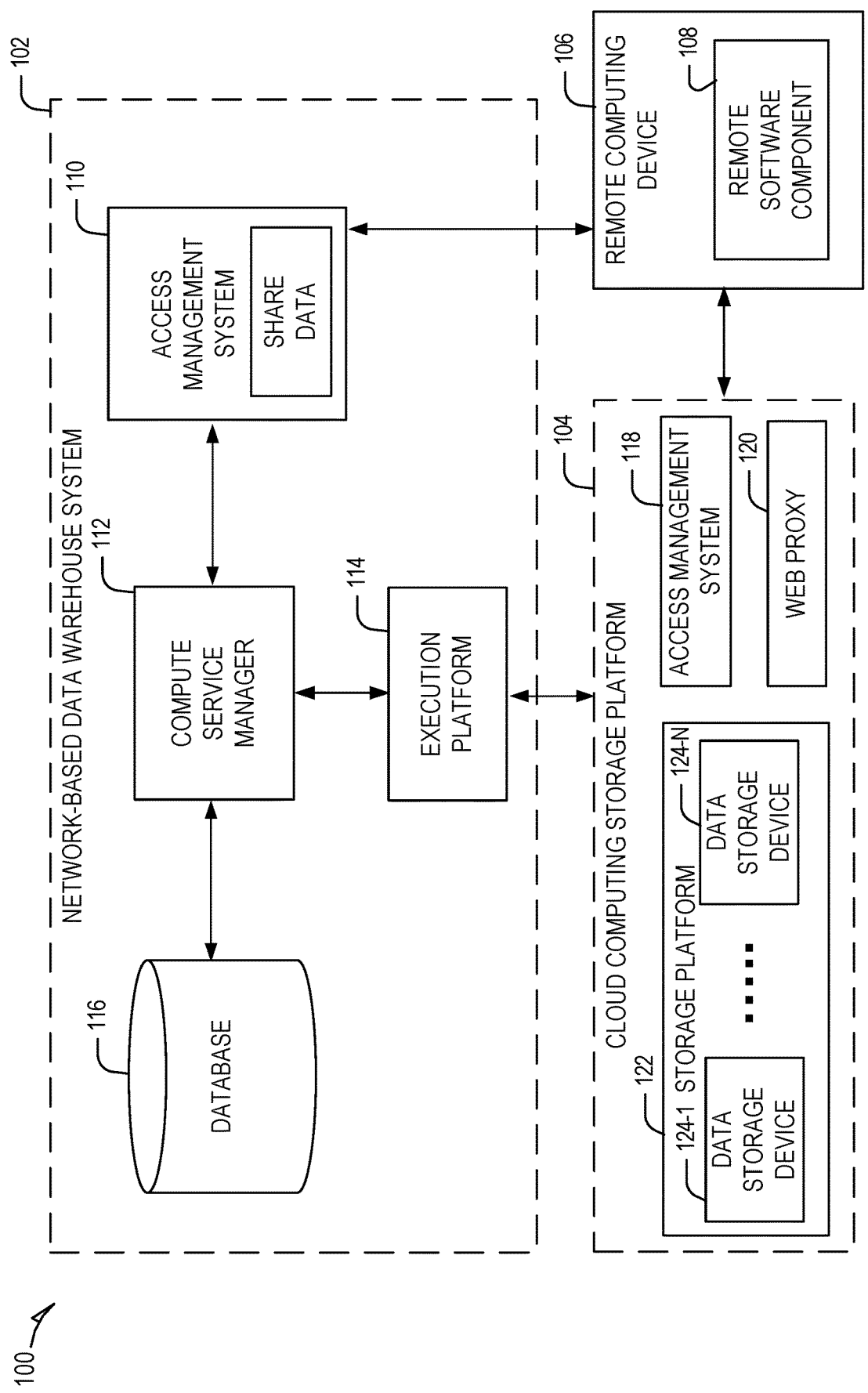
FIG. 1 illustrates an example computing environment in which a network-based data warehouse system can implement streams on shared database objects, according to some example embodiments.

FIG. 1 illustrates an example shared data processing platform 100 implementing secure messaging between deployments, in accordance with some embodiments of the present disclosure. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., a storage platform, an AWS® service, Microsoft Azure®, Google Cloud Platform/Google Cloud Services®, etc.), and a remote computing device 106. The network-based data warehouse system 102 is a network-based system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data warehouse system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based data warehouse system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views, as discussed in further detail below.

The network-based data warehouse system 102 comprises an access management system 110, a compute service manager 112, an execution platform 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store share data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data warehouse system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-*n* that are part of a cloud computing storage platform 104. In some embodiments, data storage devices 124-1 to 124-*n* are cloud-based storage devices located in one or more geographic locations. For example, data storage devices 124-1 to 124-*n* may be part of a public cloud infrastructure or a private cloud infrastructure. Data storage devices 124-1 to 124-*n* may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data warehouse system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based data warehouse system 102. The decoupling of the computing resources from the data storage devices 124-1 to 124-n supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-n in the cloud computing storage platform 104. Thus, the computing resources and cache resources are not restricted to specific data storage devices 124-1 to 124-n. Instead, all computing resources and all cache resources may retrieve data from, and store data to, any of the data storage resources in the cloud computing storage platform 104.

Figure 2:
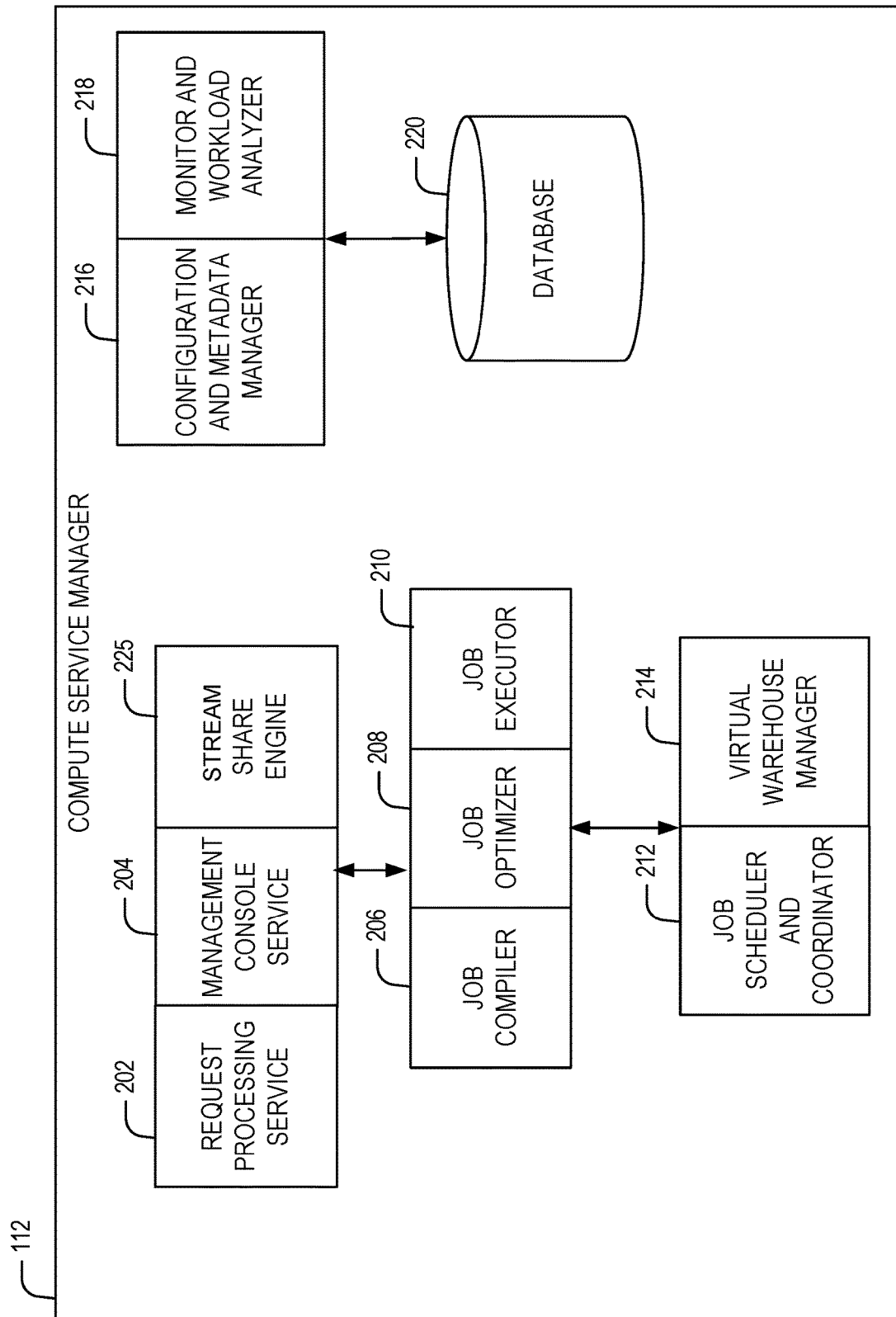
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments, and as discussed in further detail below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, a operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based data warehouse system 102. For example, data storage device 220 may represent caches in execution platform 114, storage devices in cloud computing storage platform 104, or any other storage device.

Figure 3:
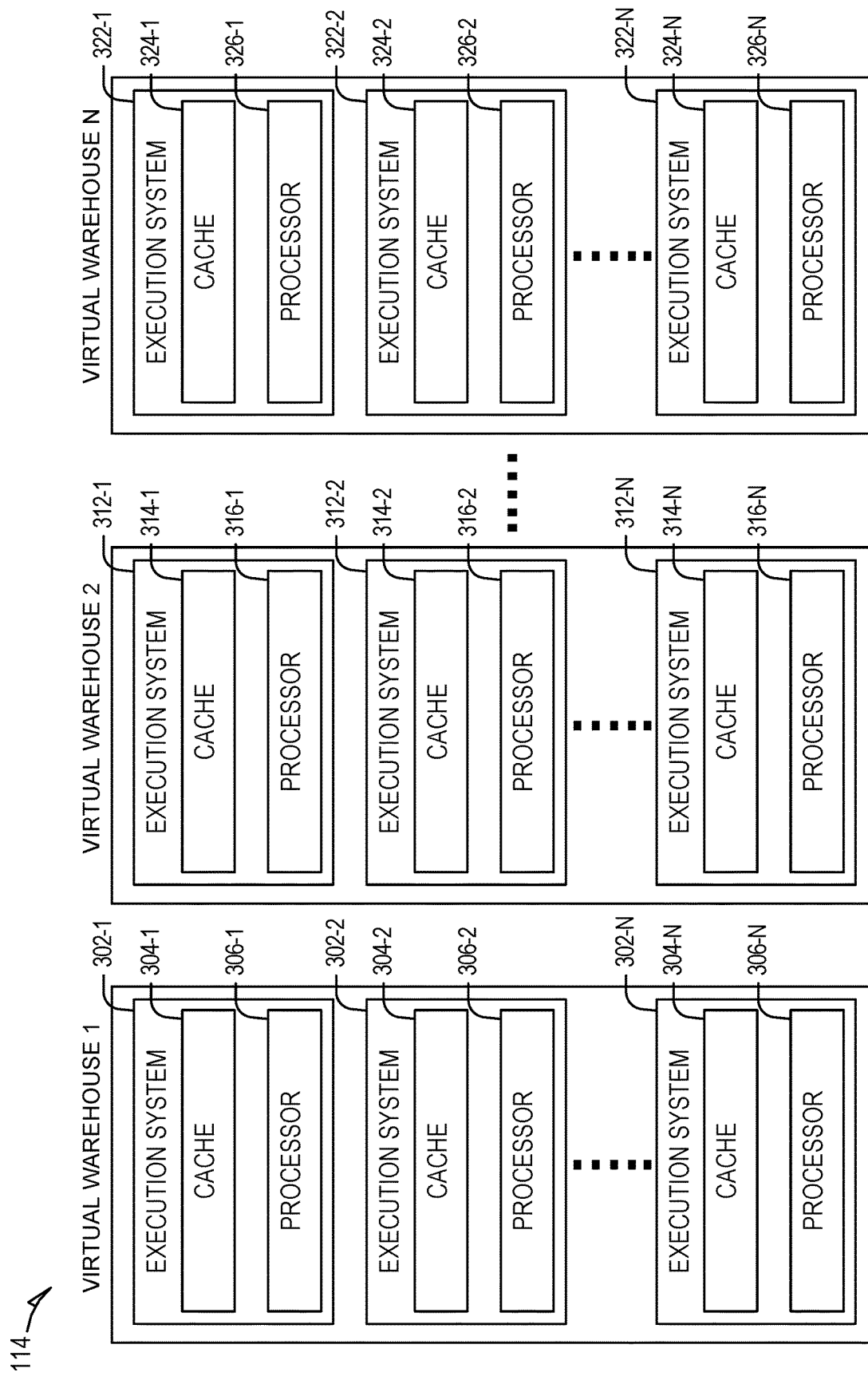
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-n shown in FIG. 1. Thus, the virtual warehouses are not necessarily assigned to a specific data storage device 124-1 to 124-n and, instead, can access data from any of the data storage devices 124-1 to 124-n within the cloud computing storage platform 104. Similarly, each of the execution nodes shown in FIG. 3 can access data from any of the data storage devices 124-1 to 124-n. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node **302-*n*** at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
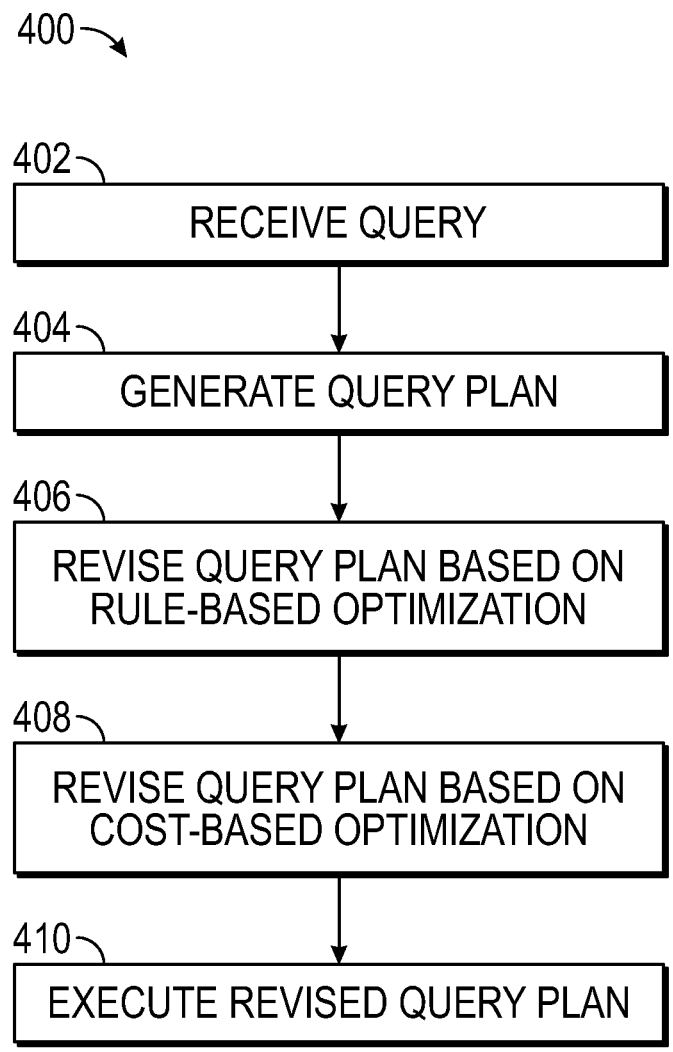
FIG. 4 shows a flow diagram of a method for executing a query, according to some example embodiments.

FIG. 4 shows a flow diagram of a method 400 for executing a query, according to some example embodiments. The method 400 may be executed by a computer service manager (e.g., computer service manager 112. In an embodiment, the method 400 may be executed by a query coordinator (QC) and/or foreground global service (GS). At operation 402, a query may be received. The query may include a request for one or more operations to be run on a data set, such as a source table. For example, the query may include a SQL string. At operation 404, in response to receiving the query, a query plan may be created to execute the received query. For example, the SQL string may be parsed. The query plan may include a plurality of operators and links connecting the operators.

At operation 406, the query plan may be revised based on rule-based optimization. That is, the query plan, which for example may be represented as a relational algebra tree, may be revised into a better form based on a set of rules. The rules may be directed to pruning or constant folding one or more operators based on predicate properties, predicate simplification, filter pushdown, eliminating unnecessary grouping or aggregation, and/or other suitable rules.

At operation 408, the query plan may be revised based on cost-based optimization. That is, logically equivalent fragments of the query plan may be enumerated and then selected based on estimated costs. This may include cardinality estimation, join reordering, aggregation pushdown, access path selection, and/or other suitable techniques. Moreover, this may include materialized view rewriting, as described herein. Materialized view rewriting may entail transparently rewriting the query plan to use a predefined materialized view rather than the source table for at least one fragment. A materialized view may include a database object that includes final or intermediate results of a database query. The materialized view may include a local cached copy of database data, a subset of rows or columns of a table, the result of a join, the result of an aggregate function, and so forth. Materialized views may be defined by a client or system administrator and may include any suitable information. Materialized views may be generated to aid in the execution of specific common queries.

A materialized view may be a declarative specification of a persistent query result that is automatically maintained and transparently utilized. In an embodiment, a materialized view may include a local copy of data located remotely or may include a subset of rows and/or columns (may be referred to as a "partition" or "micro-partition") of a source table or join result or may alternatively include a summary using an aggregate function. Materialized views may be generated by way of materialization, where the results of a query are cached similar to memorization of the value of a function in functional languages. Materialized views improve performance of expensive queries by materializing and reusing common intermediate query results in a workload. Materialized views are utilized to improve performance of queries at the expense of maintenance cost and increased storage requirements.

To aid in understanding the disclosure, an example implementation of using a materialized view is provided. An example client of a database platform is a marketing organization. In the example, the marketing organization stores large sums of database data pertaining to potential customers that may purchase goods or services advertised by the marketing organization. The marketing organization may store, for example, names, contact information, gender, socioeconomic status, and other information about each potential customer. The marketing organization may commonly run advertising campaigns that are specific to different geographic regions. Because the marketing organization is interested in the locations of its potential customers, the marketing organization may commonly run queries to identify all potential customers in a certain city, state, or geographic region. For example, the marketing organization may request to know how many male potential customers and how many female potential customers are located in the state of California in the United States. Because the marketing organization frequently wants to know this information for different marketing campaigns, the marketing organization may define a materialized view for this information. The materialized view might give two summary numbers, one indicating the quantity of male potential customers in the state of California, and another indicating the quantity of female potential customers in the state of California. These numbers are determined based on a "source table" for the materialized view. The source table could be very large and may include information for every potential customer of the marketing organization. When the source table is updated, the materialized view may become "stale" with respect to the source table such that the materialized view no longer provides accurate numbers for the quantities of male and female potential customers in the state of California. It is therefore desirable to ensure the materialized view is refreshed with respect to its source table so the materialized view can be relied upon when executing database queries. It should be appreciated that this example implementation is provided only for aiding in the understanding of the disclosure and should not be limiting to the scope of the disclosure. The materialized view may provide any suitable information and may be customized by the client account. The materialized view is not limited to aggregate information as discussed in the example implementation and may provide different information suitable to the needs of the client account.

Materialized views may provide certain performance benefits to database operations. A materialized view may require a small amount of additional storage when compared against a source table from which the materialized view is based. The materialized view may be automatically updated and maintained by the database system and may be transparently utilized without changing an existing workload on the source table.

At operation 410, the revised query plan may be executed, and a result of the query may be generated. The result of the query may be presented to the user.

Figure 5:
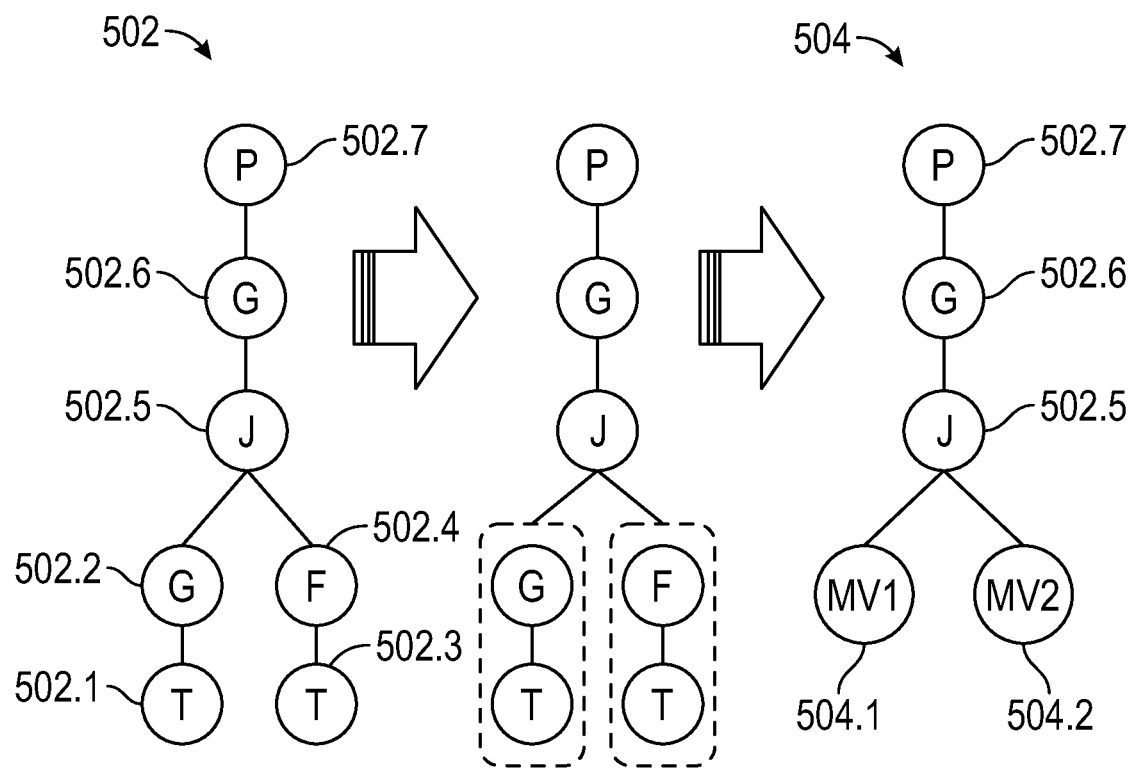
FIG. 5 a block diagram illustrating a method for an automatic materialized view rewrite, according to some example embodiments.

FIG. 5 is a block diagram illustrating a method for an automatic materialized view rewrite, according to some example embodiments. First, a query plan 502 may be generated. As shown, the query plan 502 may include a plurality of operators connected with links to execute the query: a first table scan operator 502.1, a first group operator 502.2, a second table scan operator 502.3, a filter operator 502.4, a join operator 502.5, a second group-by operator 502.6, and a project (or result) operator 502.7.

Next, parts or fragments of the query plan 502 that are suitable to be rewritten to utilize materialized views may be identified. That is, query fragments, which may be efficiently served by an existing materialized view (MV) may be identified. In the example of FIG. 5, two such query fragments may be identified: 1) the first table scan operator 502.1 and the first group-by operator 502.2, and 2) the second table scan operator 502.3 and the filter operator 502.4.

The query plan may be revised and rewritten with an MV-accessing plan as shown in the revised query plan 504. Here, the query fragment including the first table scan operator 502.1 and the first group-by operator 502.2 may be rewritten as reading MV1 504.1, an existing materialized view that is logically-equivalent to the first table scan operator 502.1 and the first group-by operator 502.2. Likewise, the query fragment including second table scan operator 502.3 and the filter operator 502.4 may be rewritten as reading MV2 504.2, an existing materialized view that is logically-equivalent to second table scan operator 502.3 and the filter operator 502.4. As explained in further detail below, the query plan may be rewritten in such a way if the revised query plan 504 may be more cost-effective (e.g., less processing time, use fewer computing resources, etc.)

Next, different techniques and processes to identify and rewrite query fragments to utilize existing materialized views are described. The process of identifying and rewriting may be classified into three phases: a) a collection phase, b) an enumerating phase, and c) a ranking phase.

Figure 6:
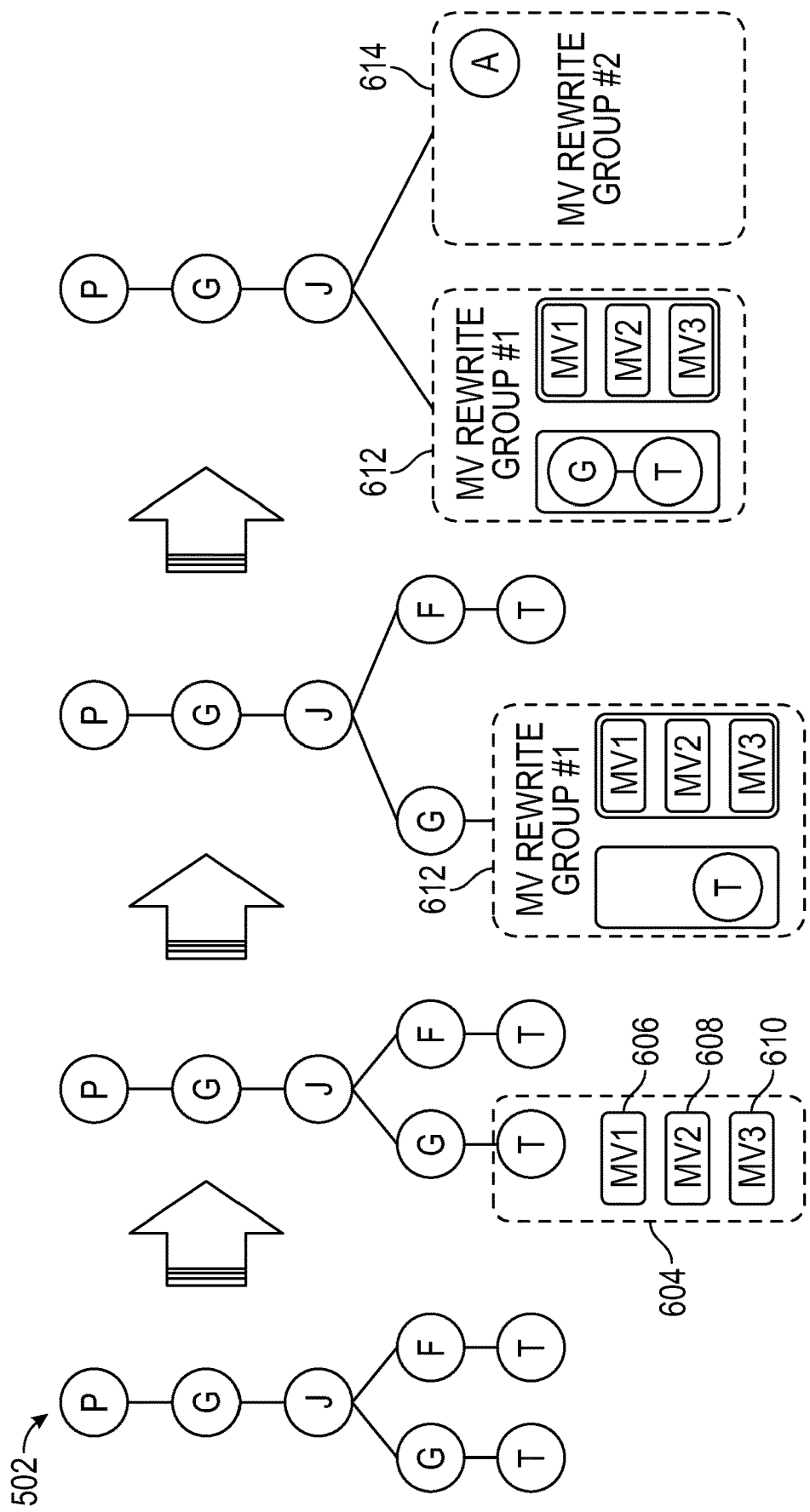
FIG. 6 is a block diagram illustrating a method for a collection phase of an automatic materialized view rewrite, according to some example embodiments.

FIG. 6 is a block diagram illustrating a method for a collection phase of an automatic materialized view rewrite, according to some example embodiments. The query plan 502, as described above with reference to FIG. 5, will be used in this example for illustration purposes. The system may check if the first table scan operator 502.1 may be suitable to be served by an existing materialized view (e.g., eligible for materialized-view replacement). For instance, the system may check if there are any existing materialized views that refer to the table identified in first table scan operator 502.1 (and second table scan operator 502.3). As shown in grouping 604, all candidate MVs may be identified; each candidate MV may include table scan operator referring to the same source table identified in the first table scan operator 502.1. Here, MV1 606, MV2 608, and MV3 610 may be identified. The candidate MVs may be collected by searching existing MVs for table scan operators, including subsequent filter and group-by functions (e.g., "TableScan-[Filter]-[GroupBy]"). Next, those candidate MVs may be collected into a MV rewrite group 612 for the first query fragment, including the first table scan operator 502.1 and the first group-by operator 502.2. Likewise, candidate MVs may be collected into a MV rewrite group 614 for the second query fragment, including the second table scan operator 502.3 and the filter operator 502.4.

Figure 7:
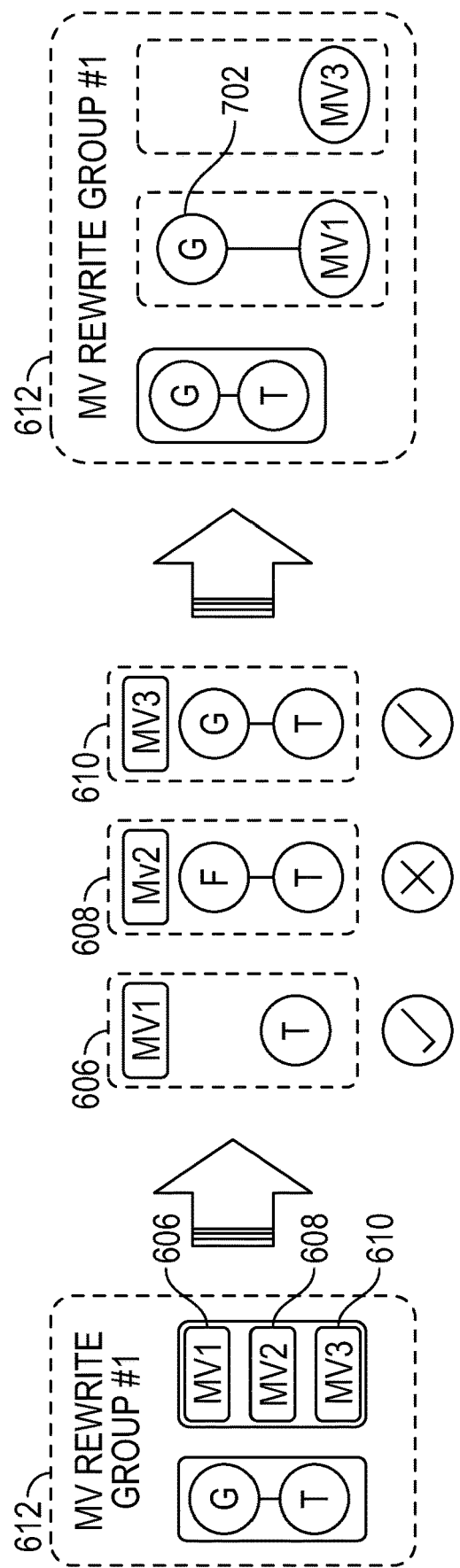
FIG. 7 is a block diagram illustrating a method for an enumerating phase of an automatic materialized view rewrite, according to some example embodiments.

FIG. 7 is a block diagram illustrating a method for an enumerating phase of an automatic materialized view rewrite, according to some example embodiments. The MV rewrite group 612 for the first query fragment, including the first table scan operator 502.1 and the first group-by operator 502.2, will be used in this example, as described above with reference to FIG. 6. Each candidate MV 606-610 may be evaluated to determine whether they can match the source plan fragment, e.g. query fragment. Each candidate MV 606-610 may also be evaluated to determine whether the MV can emit a logically equivalent result set by itself, with one or more compensating operations, or not at all (e.g., qualify as a viable candidate materialized view). A compensating operator may include an operation to be performed on an existing MV to emit a logically equivalent result set of a query fragment.

In this example, each candidate MV 606-610 may be evaluated. It may be determined that MV1 606 includes a clustered table scan (and nothing else). Thus, MV1 606 may be used to emit the logically equivalent result set of the first query fragment, including the first table scan operator 502.1 and the first group-by operator 502.2, with one or more compensating operators. For example, a compensating group-by operator 702 may be added to MV1 606 to emit a logically equivalent result set of the first query fragment.

MV2 608 may include a table scan operation followed by filtering operation; therefore, it may be determined that MV2 608 may not emit the logically equivalent result set of the first query fragment with or without any compensating operators. Thus, MV2 608 may be eliminated from the final MV rewrite group 612. MV3 610 may include a table scan operation and following by a group-by operation, generating an aggregated table; therefore, it may be determined that MV3 610 may emit the logically equivalent result set of the first query fragment without any compensating operators. Thus, MV1 606 with compensating operator 702 and MV3 610 may remain candidate alternative MV-accessing plans for the first query fragment (e.g., viable candidate MV-accessing plans) while MV2 608 may be eliminated.

Figure 8:
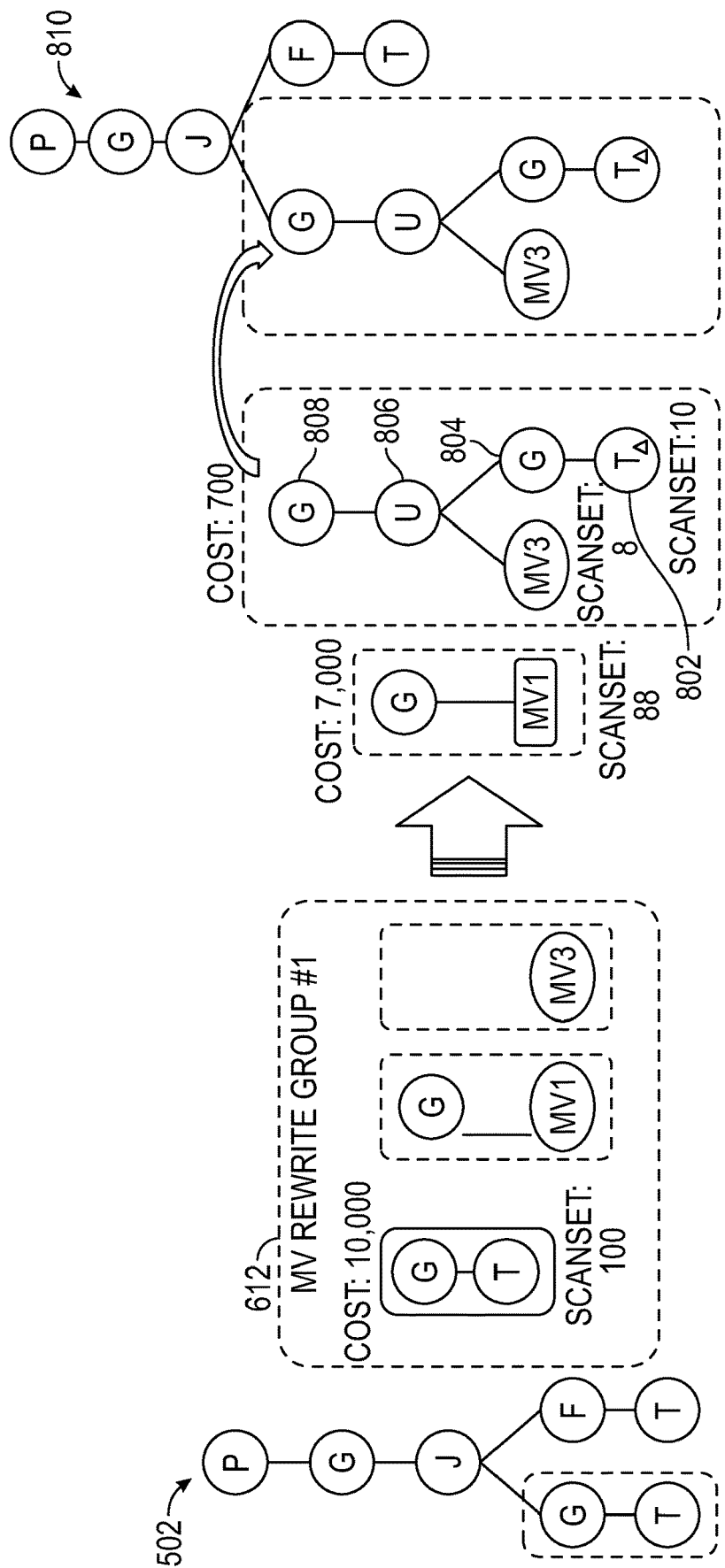
FIG. 8 is a block diagram illustrating a method for a ranking phase of an automatic materialized view rewrite, according to some example embodiments.

FIG. 8 is a block diagram illustrating a method for a ranking phase of an automatic materialized view rewrite, according to some example embodiments. The query plan 502 and the MV rewrite group 612 will be used in this example as described above with reference to FIGS. 5-7. Costs for each of the remaining MV-accessing plans may be calculated, and the MV-accessing plans may be ranked based on the calculated costs. In an embodiment, the MV-accessing plan associated with the lowest cost may be selected as an alternative to replace the selected query fragment in the query plan. Cost may be measured in terms of number of records to be processed, which may correspond to processing time.

In this example, the cost for MV1-accessing plan and MV3-accessing plan may be calculated. For reference, the cost of the selected query fragment in the query plan 502 may be calculated. The cost of performing the first table scan operator 502.1 and the first group-by operator 502.2 using the source table may involve 100 scansets, resulting in a cost of 10,000.

In addition to the number of records to be processed, the calculated cost may take into account the cost related to refreshing a materialized view if needed. Here, data in MV1 606 may be fresh, so MV1 606 may not need to be refreshed. The total cost of the MV1-accessing plan may then include reading MV1 606 and performing the compensating operator 702, which may involve 88 scansets, resulting in a total cost of 7,000.

In this example, data in MV3 610, on the other hand, may have become stale, so may need to be refreshed before using it. To refresh the data for use in MV3-accessing plan, the plan may be rewritten. Here, a table scan operator 802 may be added to table scan a delta portion of the source table. The delta portion may include the changed portion of the source table since the last time MV3 610 was refreshed. A group-by operator 804 may be performed on the results of the tablescan operator 802 of the delta portion. A union operator 806 may then be performed on the results of the group-by operator 804 and MV3 610, followed by another group-by operator 808. The total cost for this revised MV3-accessing plan, accounting for stale data in MV3 610, may involve a total of 18 scansets (8 scansets for MV3 and 10 scansets for the delta portion), resulting in a total cost of 700. Thus, even with rewriting the MV3-accessing plan to account for refreshing data, the MV3-accessing plan still has a lower cost than the MV1-accessing plan, which had a total cost of 7,000, and the original query fragment, which had a total cost of 10,000. Therefore, the revised MV3-accessing plan may replace the first query fragment in a revised query plan

810. The revised query plan 810 may then be executed to generate the result of the query.

Referring back to the enumerating phase described above, a candidate MV may be evaluated on whether it can emit a logically equivalent result set by itself or with one or more compensating operations. Existing MVs may not match up directly with a query fragment but may nonetheless be used as an alternative to reduce cost. A MV may be used as part of a MV-accessing plan when all possible results of the query fragment are included in the MV. In the case that more data than the results of the query fragment are included in the MV, further pruning using one or more compensating operations may be applied. This may find application in different situations, such as predicate subsumption, aggregate subsumption, and filter subsumption.

Figure 9:
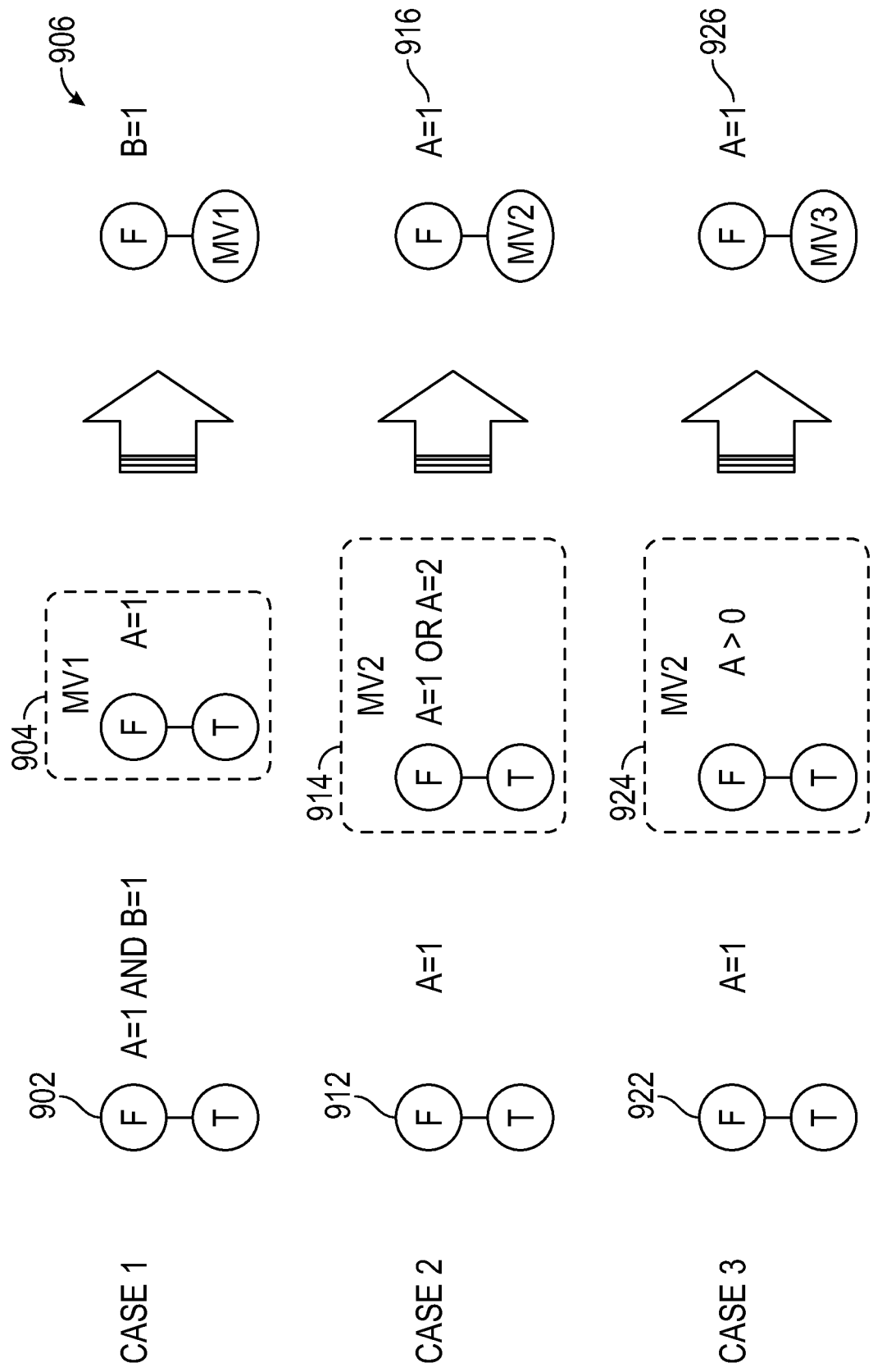
FIG. 9 illustrates different cases for evaluating predicate subsumption of candidate materialized views, according to some example embodiments.

FIG. 9 illustrates different cases for evaluating predicate subsumption of candidate materialized views, according to some example embodiments. The cases described here are for illustration purposes only, and various embodiments described herein are not limited to these cases. The first case concerns conjunction. Here, the query fragment 902 may include a table scan operator followed by a filter operator for a=1 and b=1. A candidate MV1 904 may include a table scan operator followed by a filter operator but for just a=1. Nonetheless, MV1 904 may be used in a MV-accessing plan 906, which may add a filter operator being performed on MV1 for b=1. Because MV1 904 already included filtered results for a=1, the MV-access plan 906 may generate logically equivalent result set to the query fragment 902 with the compensating operator.

The second case concerns disjunction. Here, the query fragment 912 may include a table scan operator followed by a filter operator for a=1. A candidate MV2 914 may include a table scan operator followed by a filter operator for a=1 or a=2. Nonetheless, MV2 914 may be used in a MV-accessing plan 916, which may include a filter operator being performed on MV2 for a=1. Because MV2 914 already included filtered results for a=1 or b=1, the MV-access plan 916 may generate logically equivalent result set to the query fragment 912, as shown.

The third case concerns ranges. Here, the query fragment 922 may include a table scan operator followed by a filter operator for a=1. A candidate MV3 924 may include a table scan operator followed by a filter operator for a>0. Nonetheless, MV3 924 may be used in a MV-accessing plan 926, which may include a filter operator being performed on MV3 924 for a=1. Because MV3 924 already included filtered results for a>0, the MV-access plan 926 may generate logically equivalent result set to the query fragment 922, as shown.

Figure 10A:
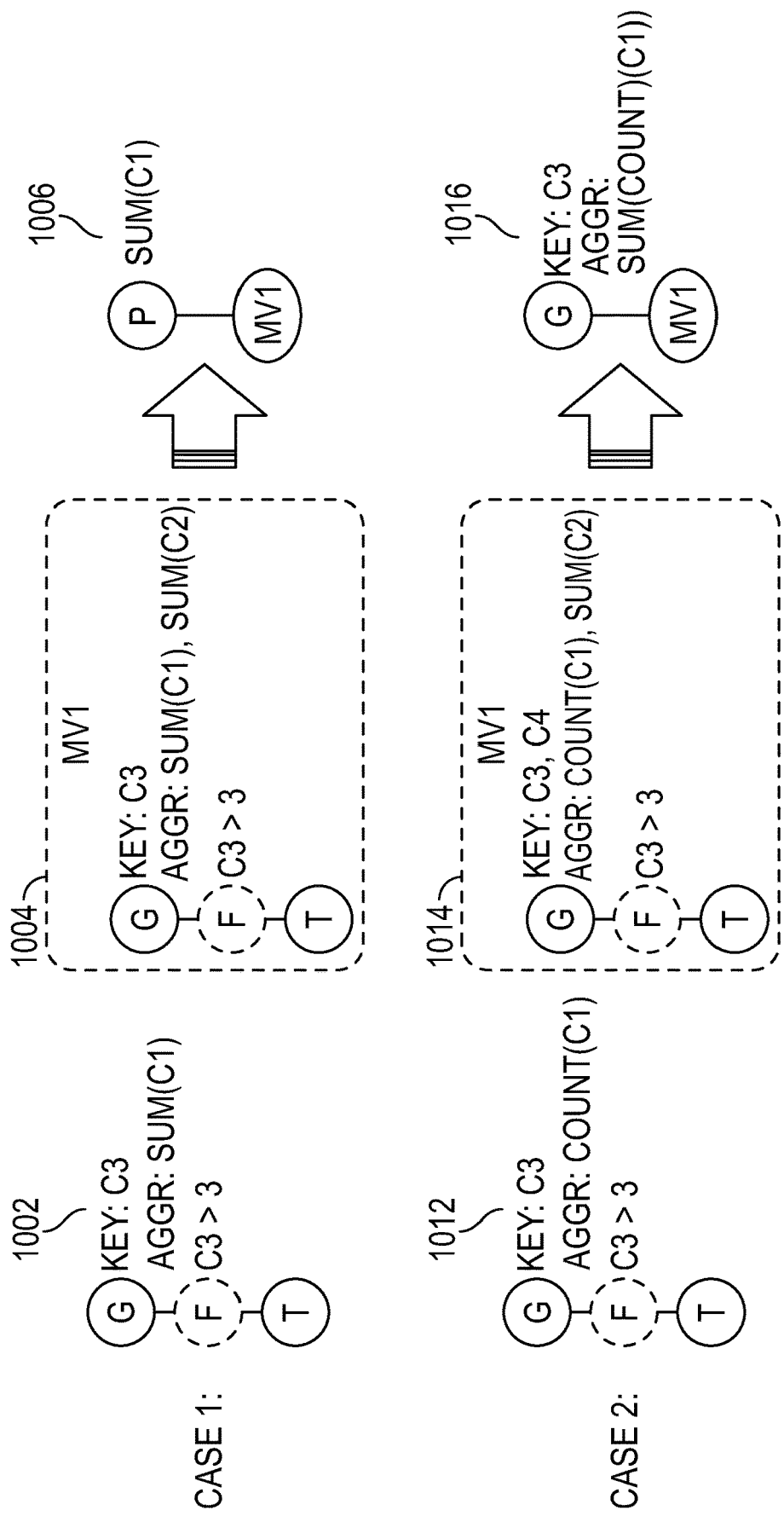
FIGS. 10A-10B illustrate different cases for evaluating aggregation subsumption of candidate materialized views, according to some example embodiments.
Figure 10B:
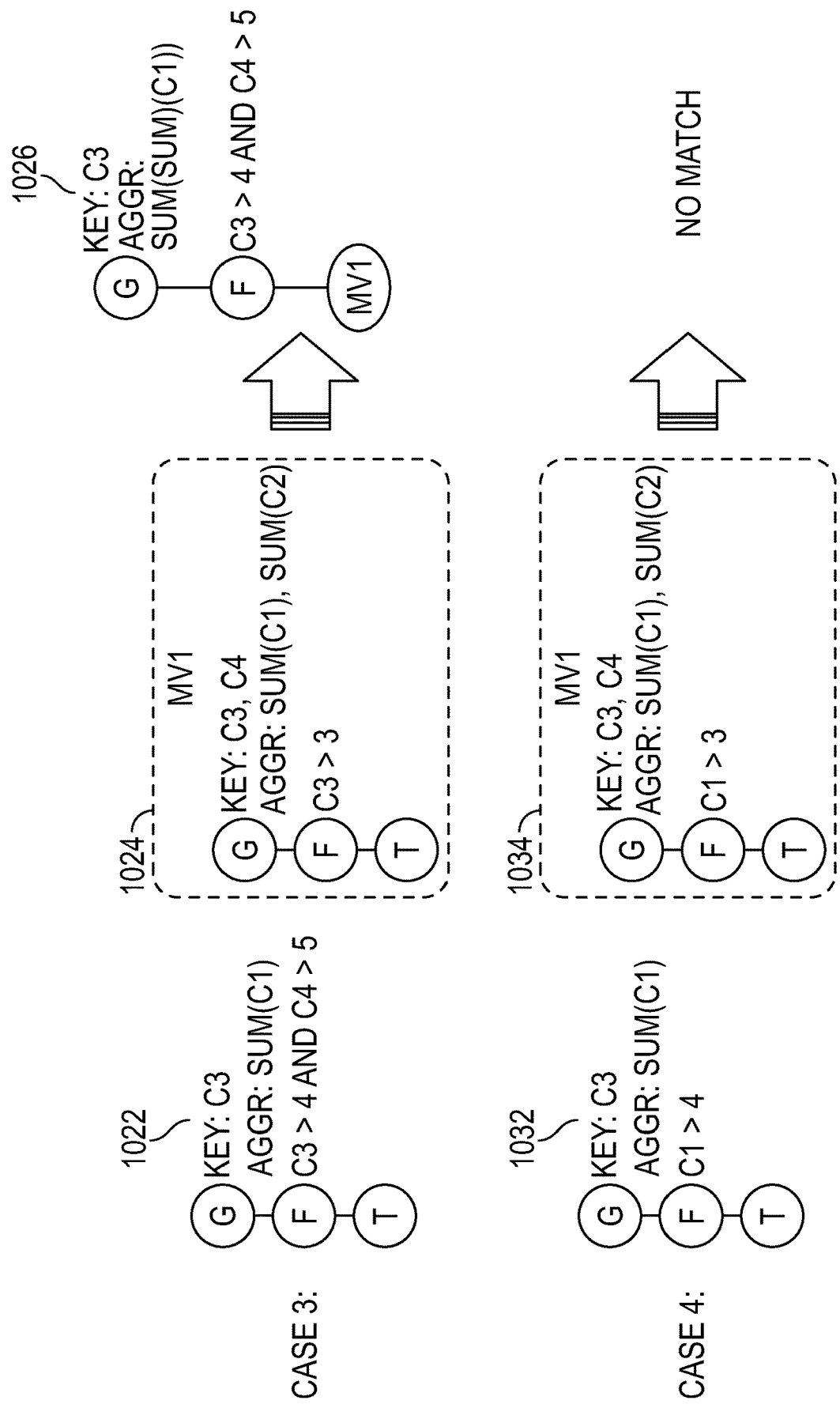

FIGS. 10A-10B illustrate different cases for evaluating aggregation subsumption of candidate materialized views, according to some example embodiments. The cases described here are for illustration purposes only, and various embodiments described herein are not limited to these cases. In the first case, the query fragment 1002 may include a table scan operator followed by a filter operator for c3>3 followed by group-by operator with Key: c3 and Aggr: sum(c1). A candidate MV1 1004 may include the same operators as the query fragment 1002 but with one difference: Aggr: sum (c1), sum(c2). Therefore, MV1 1004 may be used in a MV-accessing plan 1006, which includes a projection operator sum(c1) being performed on MV1 to provide the requested result column, as shown.

In the second case, extra keys may be included in the materialized view. Here, the query fragment 1012 may include a table scan operator followed by a filter operator for c3>3 followed by group-by operator with Key: c3 and Aggr: count(c1). A candidate MV1 1014 may include the same operators as the query fragment 1012 with the difference: Key: c(4), Aggr: sum(c2). Therefore, MV1 1014 may be used in a MV-accessing plan 1016 with corresponding compensating operator, as shown.

In the third case, extra keys and filter subsumption for group-by keys may be included in the materialized view. Here, the query fragment 1022 may include a table scan operator followed by a filter operator for c3>4 and c4>5, followed by group-by operator with Key: c3 and Aggr: sum(c1). A candidate MV1 1024 may include the same operators as the query fragment 1022 with the difference: Key: c(4), Aggr: sum(c2), and filter c3>3. Therefore, MV1 1024 may be used in a MV-accessing plan 1026 with corresponding compensating operator, as shown.

In the fourth case, the materialized view may not match with the query fragment. Here, the query fragment 1032 may include a table scan operator followed by a filter operator for c1>4 followed by group-by operator with Key: c3 and Aggr: sum(c1). A candidate MV1 1034 may include the same operators as the query fragment 1032 with the difference: Key: c(4), Aggr: sum(c2, and filter c1>3. Therefore, MV1 1014 may be not be used in an alternative MV-accessing plan.

Filter subsumption may also be evaluated. For example, consider a candidate MV has filter "A>x", and query fragment has a filter "A≥y". Therefore, the expression "y≥x" may be evaluated to check filter subsumption. In this example, if y is greater or equal to x (e.g., true), then the candidate MV may be used in an MV-accessing plan. Moreover, filter subsumption may also be applied to expressions on columns, for example dates. For example, consider a candidate MV has a filter D≥"2019-10-10" and a fragment query has a filter D≥2020. Thus, the candidate MV may be used in an MV-accessing plan, with a compensating operator as described herein.

In an embodiment, MV matching may be intertwined with other query optimization steps, such as pruning or folding. As discussed above (e.g., operation 406 in FIG. 4), a query plan may be revised into a better form based on a set of rules, such as those directed to pruning or constant folding one or more operators based on predicate properties and other suitable rules. This rule-based revision to the query plan may affect MV matching described herein.

Figure 11:
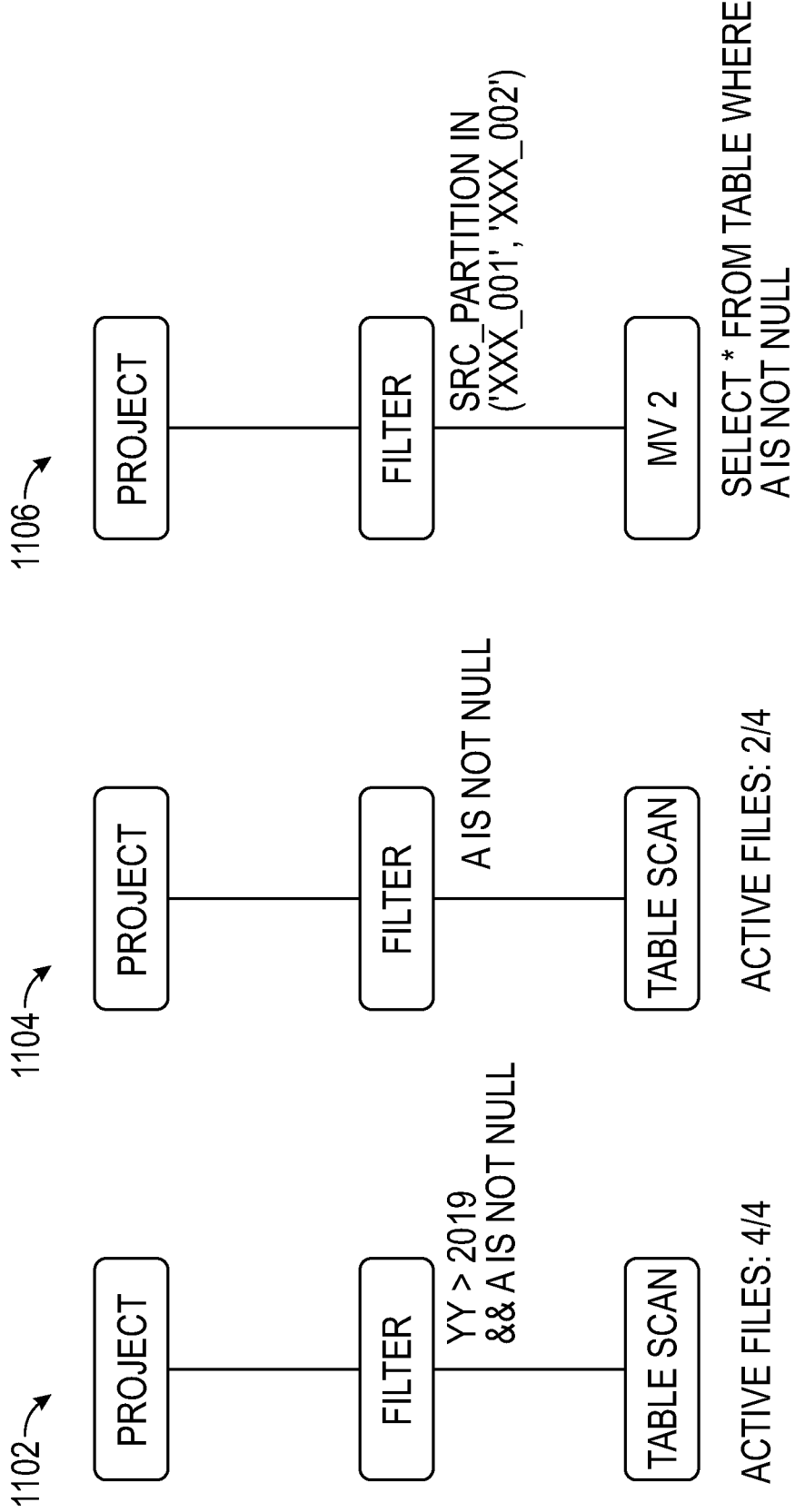
FIG. 11 illustrates an example of MV fragment matching based on a pruned scanset, according to some example embodiments.

FIG. 11 illustrates an example of MV fragment matching based on a pruned scanset, according to some example embodiments. Query fragment 1102 may include three operators: a table scan operator of all active files (e.g., 4/4), a filter operator to filter data having a year greater than 2019 and where A is not null, and a project operator. Active files may refer to files, partitions, and/or micro-partitions.

A micro-partition may be an immutable storage device in a database table that cannot be updated in-place and must be regenerated when the data stored therein is modified. A micro-partition may be considered a batch unit where each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular selection of the micro-partitions to be scanned, which can be comprised of millions, or even hundreds of millions, of micro-partitions. This granular selection process may be referred to herein as "pruning" based on metadata. Pruning may involve using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure.

Here, the active files (e.g., micro-partitions) may be arranged by the date of the data. Therefore, the query fragment 1102 may be pruned to generate a pruned query fragment 1104. In the pruned query fragment 1104, the table scan operator may now scan a subset of the active files (e.g., 2/4 active files) instead of all active files, based on the dates of the data in the active files. In this example, only two out of the four active files contain data after the year 2019. Therefore, the filter operator may be revised to remove the date component and includes only the component regarding A (e.g., A is not null), because all data in the prune data set (e.g., 2/4 active files) have data after the year 2019.

Next, if MV matching is performed on the pruned query fragment 1104 without taking into account the pruning performed, wrong results may be generated. For example, an MV may be chosen that includes data from before 2019 to replace the tables scan operator, and since the filter operator no longer includes the date-filtering component, the results may include data from the year before 2019.

Therefore, when selecting a candidate MV and rewriting the query plan, the pruning scanset may be taken into account. For example, if a predicate was constantly folded and the table has pruned files, the rewritten query plan may apply in-filter on source partition and rewriting to the MV-accessing plan. Here, MV2 may include a table scan of all active files and a filter for when A is not null. Thus, the rewritten query plan 1106 may replace the table scan operator and filtering component for when A is not null. Moreover, the rewritten query plan 1106 may also add a filtering component to account for the pruned scanset. Here, since the active files are partitioned based on date, the filter operator may filter based on the two micro-partitions with data after 2019 (e.g., "SRC_PARTITION in ('xxx_001', 'xxx_002'")).

Figure 12:
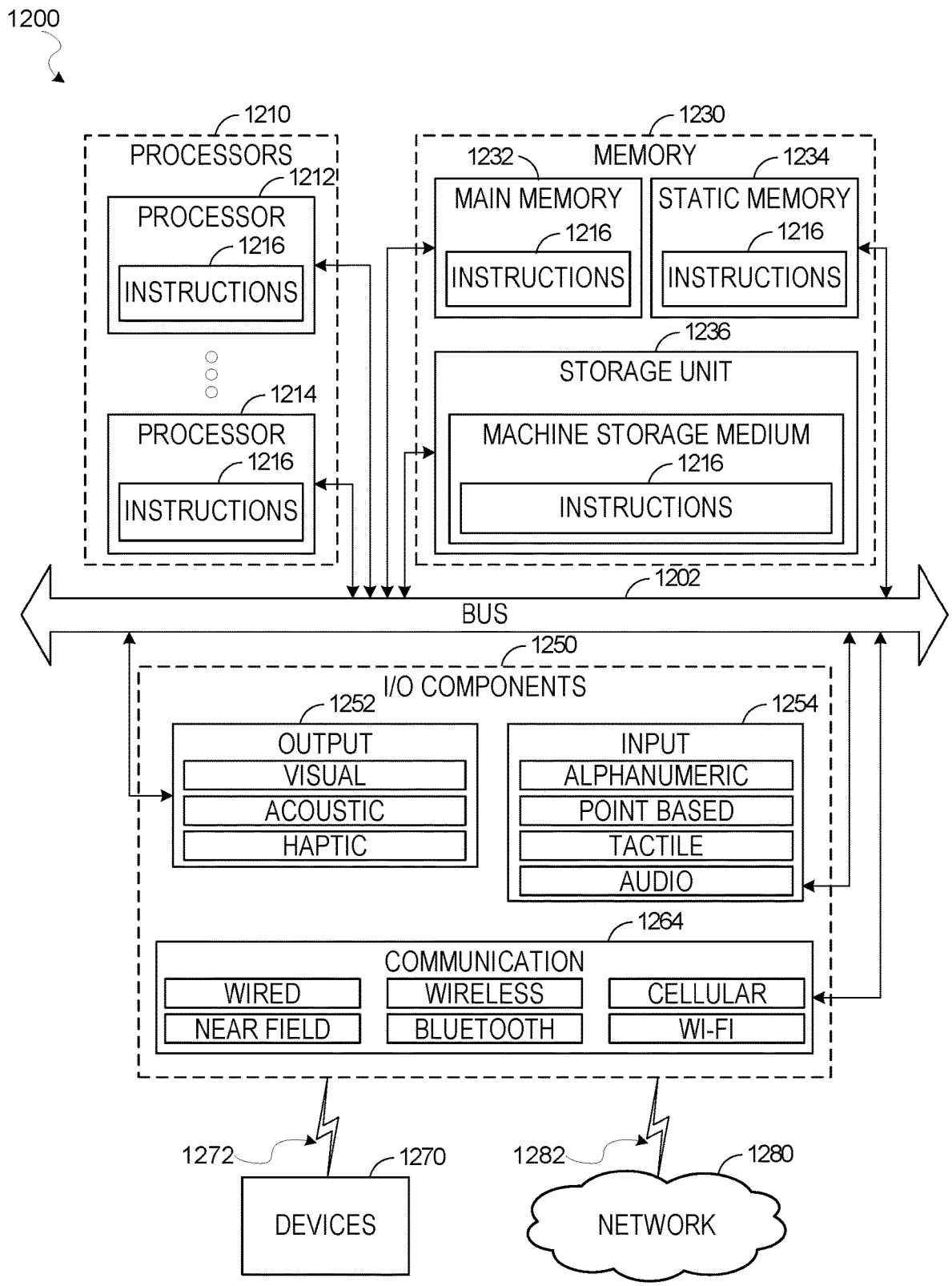
FIG. 12 illustrates a diagrammatic representation of a machine in the form of a computer system within which a set of instructions may be executed for causing the machine to perform any one or more of the methodologies discussed herein, in accordance with some embodiments of the present disclosure.

FIG. 12 illustrates a diagrammatic representation of a machine 1200 in the form of a computer system within which a set of instructions may be executed for causing the machine 1200 to perform any one or more of the methodologies discussed herein, according to an example embodiment. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example, the instructions 1216 may cause the machine 1200 to execute any one or more operations of any one or more of the methods described herein. As another example, the instructions 1216 may cause the machine 1200 to implemented portions of the data flows described herein. In this way, the instructions 1216 transform a general, non-programmed machine into a particular machine 1200 (e.g., the remote computing device 106, the access management system 110, the compute service manager 112, the execution platform 114, the access management system 118, the Web proxy 120, remote computing device 106) that is specially configured to carry out any one of the described and illustrated functions in the manner described herein.

In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 includes processors 1210, memory 1230, and input/output (I/O) components 1250 configured to communicate with each other such as via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1212 and a processor 1214 that may execute the instructions 1216. The term "processor" is intended to include multi-core processors 1210 that may comprise two or more independent processors (sometimes referred to as "cores") that may execute instructions 1216 contemporaneously. Although FIG. 12 shows multiple processors 1210, the machine 1200 may include a single processor with a single core, a single processor with multiple cores (e.g., a multi-core processor), multiple processors with a single core, multiple processors with multiple cores, or any combination thereof.

The memory 1230 may include a main memory 1232, a static memory 1234, and a storage unit 1236, all accessible to the processors 1210 such as via the bus 1202. The main memory 1232, the static memory 1234, and the storage unit 1236 store the instructions 1216 embodying any one or more of the methodologies or functions described herein. The instructions 1216 may also reside, completely or partially, within the main memory 1232, within the static memory 1234, within the storage unit 1236, within at least one of the processors 1210 (e.g., within the processor's cache memory), or any suitable combination thereof, during execution thereof by the machine 1200.

The I/O components 1250 include components to receive input, provide output, produce output, transmit information, exchange information, capture measurements, and so on. The specific I/O components 1250 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or another suitable device to interface with the network 1280. In further examples, the communication components 1264 may include wired communication components, wireless communication components, cellular communication components, and other communication components to provide communication via other modalities. The devices 1270 may be another machine or any of a wide variety of peripheral devices (e.g., a peripheral device coupled via a universal serial bus (USB)). For example, as noted above, the machine 1200 may correspond to any one of the remote computing device 106, the access management system 110, the compute service manager 112, the execution platform 114, the access management system 118, the Web proxy 120, and the devices 1270 may include any other of these systems and devices.

The various memories (e.g., 1230, 1232, 1234, and/or memory of the processor(s) 1210 and/or the storage unit 1236) may store one or more sets of instructions 1216 and data structures (e.g., software) embodying or utilized by any one or more of the methodologies or functions described herein. These instructions 1216, when executed by the processor(s) 1210, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1280 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1272 (e.g., a peer-to-peer coupling) to the devices 1270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1216 for execution by the machine 1200, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The following numbered examples are embodiments:

Example 1. A method comprising: receiving, by a processor, a query directed to a source table; generating a query plan to execute the query, the query plan including a plurality of operators; rewriting the query plan to generate a rewritten query plan using a materialized view and at least one compensating operator in place of a fragment of the query plan, the fragment including one or more of the plurality of operators in the query plan; and executing the rewritten query plan.

Example 2. The method of example 1, further comprising: identifying the one or more of the plurality of operators of the fragment eligible for materialized-view replacement; and collecting one or more candidate materialized views for a first operator of the fragment.

Example 3. The method of any of examples 1-2, further comprising: evaluating one or more of the candidate materialized views to determine whether one or more of the candidate materialized views is capable of generating a logically equivalent result set as the fragment by itself or with at least one compensating operator to qualify as a viable candidate materialized view.

Example 4. The method of any of examples 1-3, wherein evaluating one or more of the candidate materialized views includes detecting a predicate subsumption, an aggregate subsumption, or a filter subsumption.

Example 5. The method of any of examples 1-4, further comprising: calculating cost of processing the fragment; calculating cost of processing each of the viable candidate materialized views; ranking the fragment and the viable candidate materialized views based at least in part on the calculated costs; and selecting the materialized view based on the ranking.

Example 6. The method of any of examples 1-5, further comprising: calculating cost of processing the fragment; calculating cost of processing each of the viable candidate materialized views; and selecting the materialized view based at least in part on the calculated costs.

Example 7. The method of any of examples 1-6, wherein calculating cost of processing one of the viable candidate materialized views takes into account a cost for refreshing data in the viable candidate materialized view.

Example 8. The method of any of examples 1-7, further comprising: revising the query plan based on rule-based optimization.

Example 9. The method of any of examples 1-8, wherein rewriting the query plan takes into account revising the query plan based on rule-based optimization.

Example 10. The method of any of examples 1-9, wherein rule-based optimization includes one or more of: pruning, constant folding based on predicate properties, predicate simplification, filter pushdown, eliminating grouping, and eliminating aggregation.

Example 11. A system comprising: one or more processors of a machine; and a memory storing instructions that, when executed by the one or more processors, cause the machine to perform operations implementing any one of example methods 1 to 10.

Example 12. A machine-readable storage device embodying instructions that, when executed by a machine, cause the machine to perform operations implementing any one of example methods 1 to 10.

What is claimed is:

1. A method comprising:
receiving, by a processor, a query directed to a source table, the source table including a plurality of micro-partitions;
generating a query plan to execute the query, the query plan including a plurality of operators;
determining a first micro-partition of the plurality of micro-partitions to be pertinent to the query and determining a second micro-partition of the plurality of micro-partitions to be non-pertinent to the query;
identifying one or more of a plurality of operators of a fragment eligible for materialized-view replacement;
evaluating one or more of candidate materialized views to determine whether one or more of the candidate materialized views is capable of generating a logically equivalent result set as the fragment;
calculating cost of processing the fragment;
calculating cost of processing each of the viable candidate materialized views;
selecting the materialized view based at least in part on the calculated costs;
rewriting the query plan to generate a rewritten query plan using the materialized view including data from the first and second micro-partitions and the rewritten query plan includes adding a new filtering operator not in the query plan taking into account the materialized view including data from the second micro-partition; and
executing the rewritten query plan.

2. The method of claim 1,
wherein generating the logically equivalent result set as the fragment includes using at least one compensating operator.

3. The method of claim 1, wherein evaluating one or more of the candidate materialized views includes detecting a predicate subsumption, an aggregate subsumption, or a filter subsumption.

4. The method of claim 1, further comprising:
ranking the fragment and the viable candidate materialized views based at least in part on the calculated costs; and
selecting the materialized view based on the ranking.

5. The method of claim 1, wherein calculating cost of processing one of the viable candidate materialized views takes into account a cost for refreshing data in the viable candidate materialized view.

6. The method of claim 1, further comprising:
revising the query plan based on rule-based optimization.

7. The method of claim 6, wherein rewriting the query plan takes into account revising the query plan based on rule-based optimization.

8. The method of claim 6, wherein rule-based optimization includes one or more of: pruning, constant folding based on predicate properties, predicate simplification, filter pushdown, eliminating grouping, and eliminating aggregation.

9. A machine-storage medium embodying instructions that, when executed by a machine, cause the machine to perform operations comprising:
receiving, by a processor, a query directed to a source table, the source table including a plurality of micro-partitions;
generating a query plan to execute the query, the query plan including a plurality of operators;
determining a first micro-partition of the plurality of micro-partitions to be pertinent to the query and determining a second micro-partition of the plurality of micro-partitions to be non-pertinent to the query;
identifying one or more of a plurality of operators of a fragment eligible for materialized-view replacement;
evaluating one or more of candidate materialized views to determine whether one or more of the candidate materialized views is capable of generating a logically equivalent result set as the fragment;
calculating cost of processing the fragment;
calculating cost of processing each of the viable candidate materialized views;
selecting the materialized view based at least in part on the calculated costs;
rewriting the query plan to generate a rewritten query plan using the materialized view including data from the first and second micro-partitions and the rewritten query plan includes adding a new filtering operator not in the query plan taking into account the materialized view including data from the second micro-partition; and
executing the rewritten query plan.

10. The machine-storage medium of claim 9,
wherein generating the logically equivalent result set as the fragment includes using at least one compensating operator.

11. The machine-storage medium of claim 9, wherein evaluating one or more of the candidate materialized views includes detecting a predicate subsumption, an aggregate subsumption, or a filter subsumption.

12. The machine-storage medium of claim 9, further comprising:
ranking the fragment and the viable candidate materialized views based at least in part on the calculated costs; and
selecting the materialized view based on the ranking.

13. The machine-storage medium of claim 9, wherein calculating cost of processing one of the viable candidate materialized views takes into account a cost for refreshing data in the viable candidate materialized view.

14. The machine-storage medium of claim 9, further comprising:
revising the query plan based on rule-based optimization.

15. The machine-storage medium of claim 14, wherein rewriting the query plan takes into account revising the query plan based on rule-based optimization.

16. The machine-storage medium of claim 14, wherein rule-based optimization includes one or more of:
pruning, constant folding based on predicate properties, predicate simplification, filter pushdown, eliminating grouping, and eliminating aggregation.

17. A system comprising:
one or more processors of a machine; and
a memory storing instructions that, when executed by the one or more processors, cause the machine to perform operations comprising:
receiving a query directed to a source table, the source table including a plurality of micro-partitions;
generating a query plan to execute the query, the query plan including a plurality of operators;
determining a first micro-partition of the plurality of micro-partitions to be pertinent to the query and determining a second micro-partition of the plurality of micro-partitions to be non-pertinent to the query;
identifying one or more of a plurality of operators of a fragment eligible for materialized-view replacement;
evaluating one or more of candidate materialized views to determine whether one or more of the candidate materialized views is capable of generating a logically equivalent result set as the fragment;

calculating cost of processing the fragment;

calculating cost of processing each of the viable candidate materialized views;

selecting the materialized view based at least in part on the calculated costs;

rewriting the query plan to generate a rewritten query plan using the materialized view including data from the first and second micro-partitions and the rewritten query plan includes adding a new filtering operator not in the query plan taking into account the materialized view including data from the second micro-partition; and executing the rewritten query plan.

18. The system of claim 17, wherein generating the logically equivalent result set as the fragment includes using at least one compensating operator.

19. The system of claim 17, wherein evaluating one or more of the candidate materialized views includes detecting a predicate subsumption, an aggregate subsumption, or a filter subsumption.

20. The system of claim 17, the operations further comprising:

ranking the fragment and the viable candidate materialized views based at least in part on the calculated costs; and selecting the materialized view based on the ranking.

21. The system of claim 17, wherein calculating cost of processing one of the viable candidate materialized views takes into account a cost for refreshing data in the viable candidate materialized view.

22. The system of claim 17, the operations further comprising:

revising the query plan based on rule-based optimization.

23. The system of claim 22, wherein rewriting the query plan takes into account revising the query plan based on rule-based optimization.

24. The system of claim 22, wherein rule-based optimization includes one or more of: pruning, constant folding based on predicate properties, predicate simplification, filter pushdown, eliminating grouping, and eliminating aggregation.

* * * * *